Figure 1:
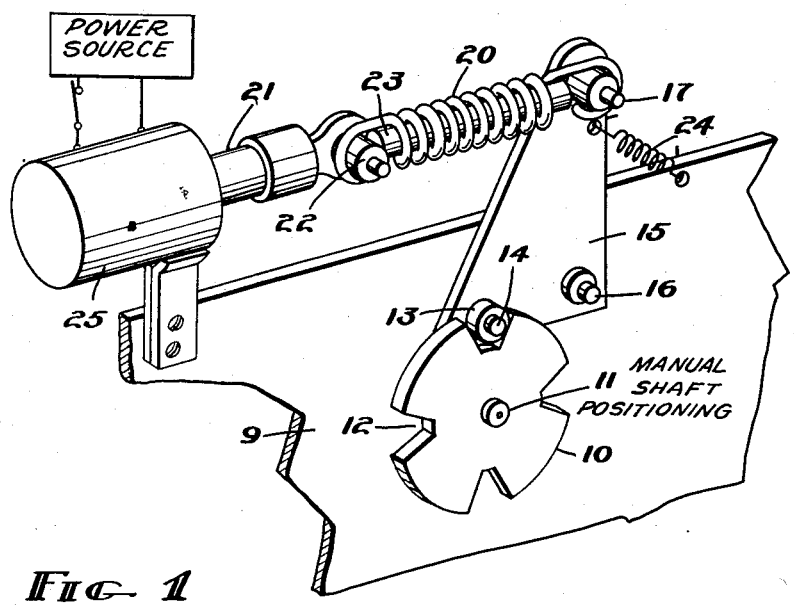

INVENTOR.
JOHN E. DAWKINS
BY
ATTORNEY

United States Patent Office 2,909,940
Patented Oct. 27, 1959

2,909,940

DETENT MECHANISM

John E. Dawkins, Hiawatha, Iowa, assignor to Collins Radio Company, Cedar Rapids, Iowa, a corporation of Iowa Application March 22, 1956, Serial No. 573,290

3 Claims. (Cl. 74—527)

This invention relates to detent mechanisms and more particularly to detents useable with alternative automatically or manually driven devices.

Prior art detents for fixed position devices in the radio field have consisted of a spring-loaded detent or bar of some sort forced into the notch of a sprocket. While these detents, used for switching and other fixed step position devices, have been satisfactory for manual use, the use of alternative automatic motor control in radios has brought in the additional requirement of releasing the detent to reduce the motor load. Detents for this purpose must necessarily engage and give a positive action with a good "feel" for manual operation, yet engage readily without using undue power or adding excessive weight to equipment such as air-borne equipment where weight is an extremely important factor.

It is an object of this invention to produce a detent which has sufficient force to be felt in manual use and give a good feel.

It is a further object of this invention to provide a detent which may be released as desired in use with alternatively motor driven or manually turned shafts.

It is a yet further object of this invention to produce an improved releasable detent which requires small operating power.

It is a feature of this invention that an electric solenoid may be used in changing the detent from automatic to manual use.

It is a further feature of this invention that the operating power of the solenoid required to engage the detent with the sprocket wheel may be reduced by the use of a pretensed spring permitting a strong enough spring having good feel. Pretension of a spring strong enough to provide a good feel stretches the spring to a length which permits a lighter solenoid to close its stroke far enough to develop the necessary pull to then hold the spring as it is used in manual operation of the detent.

Figure 2:
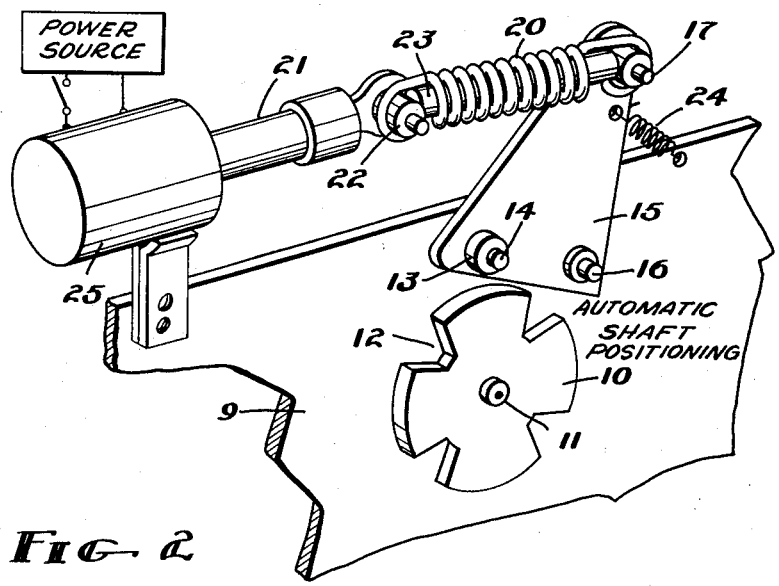

Further objects, features, and advantages of the invention will become apparent from the following description and claims when read in conjunction with the drawing, in which:

Figure 1 shows the solenoid-operated detent in the improved form and energized; and, Figure 2 shows the detent disengaged with the sprocket in the process of being positioned automatically.

In Figure 1 a sprocket or detent wheel 10 having a desired number of indexing notches 12 therein is attached to a shaft 11 which is desired to be positioned or indexed for manual rotation. Shaft 11 is mounted on a base 9 so that it may rotate freely. Mounted on or coupled to shaft 11 may be various items of radio equipment as desired such as switches, capacitors, inductors, etc. Riding in one of the notches of sprocket 10 is a detent roller 13. This detent roller is mounted on a shaft 14 which is carried on a plate 15. Plate or lever 15 is mounted pivotally on axle 16, said axle being fixed to base 9. Plate 15 is shown as a triangular member here but may take several other obvious mechanical forms such as, e.g.: an L-shaped member, provided the necessary motion of detent roller 13 radially to sprocket 10 is provided for.

Spring 20 provides an elastic coupling between perch 17 on lever 15 and spring perch 22 on the end of the solenoid plunger 21. Spring 24 is a relatively lighter spring than spring 20 and acts as the disengaging force for pulling detent roller 13 out of engagement with sprocket 10 whenever solenoid 25 is de-energized. Solenoid 25 is shown energized in Figure 1. Solenoid 25 serves as a means to hold or release the detent in accordance with the energization of the solenoid. As a consequence of energization, perch 22 is held so that spring 24 has been stretched, spring 20 is under substantially its pretension between the two perches and detent roller 13 has been forced down into one of the notches 12. At this point solenoid 25 has pulled in its plunger 21 completely and is holding the tension caused by springs 20 and 24 with a minimum of holding power.

Manual rotation of sprocket 10 now, with solenoid 25 energized, will cause detent roller 13 to be forced out of a notch 12, to roll on the circumference of the sprocket, and drop into the next notch. The spring tension felt in manual operation will be approximately that of the tension of spring 20. It can be readily seen that actually the pressure of roller 13 against sprocket 10 will be that caused by the difference of the tensions of the two springs multiplied by the mechanical advantage of lever 15.

The presence of the spring 20 as held by the solenoid provides the required feel in a solenoid-operated detent and thus is an improvement over the prior art devices where, among many types, a plunger forcing a detent roller under electromagnetic urging will produce an unrealistic feel and thus be undesirable for use in communication fields.

For automatic motor positioning of sprocket 10, and for release of the detent, solenoid 25 is de-energized as is seen in Figure 2. Return spring 24 then pulls detent roller 13 out of engagement with notch 12 as well as pulling plunger 21 to the other end of its stroke. This is the released position of the detent. Sprocket 10 can now be driven by a motor of relatively low power in an automatic positioning cycle as is shown in the figure. The tension of spring 24 must be great enough to hold lever 15 out of engagement with sprocket 10, taking into accord such force variations as vibration and variation of gravity due to change of orientation of the equipment.

In use of the above described device, however, it will be found that the operating solenoid will be required to be of a very large size in order to provide sufficient force in the motion against the resistance of the springs to be able to complete the stroke and seat the plunger at the end of its stroke. In order to reduce the operating power required of solenoid 25, a bar or rod 23 is inserted inside of spring 20 which can seat on perches 17 and 22 and hold them spaced, establishing a minimum length and thus a minimum tension of spring 20. That is to say, the length of rod 23 is of such length as to keep spring 20 under a certain predetermined pretension.

As a consequence of the pretension of spring 20, the power required of the solenoid during energization will be that of the resistance of spring 24 until roller 13 contacts sprocket 10 at which time the force required will suddenly rise to that resulting from the resistance of spring 20. This reduces the force demanded of solenoid 25 during the intermediate portion of the stroke and actually requires a force equal to the tension in spring 20 only during the portion of the plunger stroke between the contact of the roller 13 with sprocket 10 and the seating of plunger 21. As a result, the power requirements on solenoid 25 may be reduced radically from that required of a solenoid to operate against a non-pretensed spring.

Figures 1 and 2 show the preferred form of the invention of the pretensed spring 20 and spacing bar 23. As seen in Figure 1, with plunger 21 seated, spring perches 17 and 22 are spaced slightly from the ends of bar 23 transferring the predetermined tension of spring 20 onto sprocket 13 in accord with the invention. Since solenoid 25 has acted through a very short portion, and in the strongest portion, at that, of its stroke, against the full tension of spring 20, solenoid 25 will be reduced in size with an accompanying reduction of weight and electrical power demand.

Regardless of the pretensioning, solenoid 25 acts to hold perch 22 fixed in either of two positions. The first position, illustrated in Figure 1, is with the detent engaging the sprocket as a result of energization of solenoid 25. Spring perch 22 is held by the solenoid at the bottom of its stroke with a force slightly greater than the tension of spring 20. Manual operation of the sprocket 10 then encounters the proper feeling of detenting given by a sufficiently strong spring. The second position, illustrated in Figure 2, is that of the detent released. This is achieved by de-energization of the solenoid 25 permitting return spring 24 to pull spring perch 22 to a released position.

Of course, the invention may be applied to detents operable on linear motions. An example of a linear detent is one formed by notches cut on the side of a longitudinally moving bar. The same mechanism, roller 13, lever 15, springs 20, 24, and solenoid 25 can be used to engage the bar. In this case manual motion of the bar will have a definite feel, and automatic motion, by any means, may be at a reduced power level as a consequence of releasing the detent by apparatus constructed according to the invention herein.

Although this invention has been described with respect to particular embodiments thereof, it is not to be so limited because changes and modifications may be made therein which are within the full intended scope of the invention as defined by the appended claims.

I claim:

1. A releasable detent mechanism comprising a base, a shaft mounted on said base carrying a notched detent wheel, a detent roller, a lever pivotally mounted on said base and carrying said detent roller, said detent roller engageable with any of a plurality of notches in said notched wheel, a detent spring, a disengaging spring connected between said lever and said base, said disengaging spring being relatively light compared to said detent spring, a solenoid means mounted on said base, said solenoid means having a first spring perch on its plunger, a second spring perch, said second spring perch being mounted on said lever, said detent spring being carried on said first and second spring perches, a rod, said rod being held within said detent spring, said rod having sufficient length to rest on said spring perches to determine a minimum length of said detent spring, leaving said detent spring under a predetermined tension, whereby actuation of said solenoid holds said detent roller against said notched wheel with a predetermined force established by said pretensioned detent spring and de-energization of said solenoid permits release of said detent roller from contact with said notched wheel.

2. A pretensioned coupling comprising a spring, an actuating means including a movable member, a first spring perch mounted on the movable member of said actuating means, a lever, a second spring perch mounted on said lever, said spring connected between said first and second perches, and a pretensioning rod mounted longitudinally of said spring and butting against said first and second perches, said rod having a predetermined length so that the spring is under a predetermined amount of static tension.

3. A releasable spring-tension detent means comprising a base, a detent, a notched detent wheel rotatably mounted on said base, a lever, carrying said detent pivotally mounted on said base, said lever holding said detent means adjacent said notched detent wheel, an electromagnetic solenoid, a pretensioned detent spring means, said spring means coupling said solenoid to said lever, said pretensioned detent spring including a core spring and a rod of predetermined length inserted within said coil spring to cause said spring to exert a predetermined amount of tension between said solenoid and said lever, a return spring mounted between said lever and said base, said return spring being relatively weaker than said coupling spring means whereby deactivation of said solenoid releases said detent from said notched means.

References Cited in the file of this patent

UNITED STATES PATENTS

| | | |
|---|---|---|
| 304,262 | Duncan | Aug. 26, 1884 |
| 380,995 | Crandall | Aug. 10, 1888 |
| 1,007,402 | Tatum | Oct. 31, 1911 |
| 1,552,656 | Tubbs | Sept. 8, 1925 |
| 1,846,583 | Chase | Feb. 23, 1932 |
| 2,397,435 | Richards | Mar. 26, 1946 |
| 2,616,714 | Cubberley | Nov. 4, 1952 |
| 2,760,138 | Cobly | Aug. 21, 1956 |
| 2,821,275 | Martin | Jan. 28, 1958 |

FOREIGN PATENTS

| | | |
|---|---|---|
| 80,454 | Sweden | May 23, 1934 |